United States Patent
Furudate et al.

(10) Patent No.: US 12,097,484 B2
(45) Date of Patent: Sep. 24, 2024

(54) TITANIUM OXIDE FINE PARTICLES, DISPERSION LIQUID THEREOF, AND METHOD FOR PRODUCING DISPERSION LIQUID

(71) Applicant: SHIN-ETSU CHEMICAL CO., LTD., Tokyo (JP)

(72) Inventors: Manabu Furudate, Kamisu (JP); Tomohiro Inoue, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 381 days.

(21) Appl. No.: 17/432,755

(22) PCT Filed: Feb. 21, 2020

(86) PCT No.: PCT/JP2020/007204
§ 371 (c)(1),
(2) Date: Aug. 20, 2021

(87) PCT Pub. No.: WO2020/179517
PCT Pub. Date: Sep. 10, 2020

(65) Prior Publication Data
US 2022/0143582 A1 May 12, 2022

(30) Foreign Application Priority Data
Mar. 4, 2019 (JP) .................. 2019-038452

(51) Int. Cl.
| | | |
|---|---|---|
| *B01J 23/745* | (2006.01) | |
| *B01J 21/06* | (2006.01) | |
| *B01J 23/14* | (2006.01) | |
| *B01J 23/28* | (2006.01) | |
| *B01J 23/30* | (2006.01) | |
| *B01J 23/888* | (2006.01) | |
| *B01J 35/00* | (2006.01) | |
| *B01J 35/39* | (2024.01) | |
| *B01J 37/04* | (2006.01) | |
| *B01J 37/10* | (2006.01) | |
| *C01G 23/053* | (2006.01) | |

(52) U.S. Cl.
CPC .......... *B01J 23/745* (2013.01); *B01J 21/063* (2013.01); *B01J 23/14* (2013.01); *B01J 23/28* (2013.01); *B01J 23/30* (2013.01); *B01J 23/888* (2013.01); *B01J 35/19* (2024.01); *B01J 35/39* (2024.01); *B01J 37/04* (2013.01); *B01J 37/10* (2013.01); *C01G 23/053* (2013.01)

(58) Field of Classification Search
CPC . B01J 21/063; B01J 21/08; B01J 23/14; B01J 23/28; B01J 23/30; B01J 23/745; B01J 23/835; B01J 23/8472; B01J 23/881; B01J 23/887; B01J 23/888; B01J 35/0006; B01J 35/002; B01J 35/004; B01J 35/02; B01J 35/031; B01J 35/033; B01J 35/04; B01J 35/10; C01B 33/12; C01G 23/053; C01P 2002/50
See application file for complete search history.

(56) References Cited

U.S. PATENT DOCUMENTS

| | | | |
|---|---|---|---|
| 8,603,302 B2 | 12/2013 | Hashimoto et al. | |
| 9,604,198 B2 | 3/2017 | Furudate et al. | |
| 2018/0117567 A1 | 5/2018 | Furudate et al. | |
| 2018/0280932 A1 | 10/2018 | Grothe et al. | |
| 2019/0217282 A1 | 7/2019 | Furudate et al. | |
| 2020/0087162 A1* | 3/2020 | Yamaguchi | C01G 23/053 |

FOREIGN PATENT DOCUMENTS

| | | | |
|---|---|---|---|
| CN | 107427818 A | 12/2017 | |
| CN | 109126794 A | 1/2019 | |
| JP | 7-303835 A | 11/1995 | |
| JP | 2009-148700 A | 7/2009 | |
| JP | 2010-104913 A | 5/2010 | |
| JP | 2011-240247 A | 12/2011 | |
| JP | 2012-210632 A | 11/2012 | |
| TW | 201703858 A | 2/2017 | |
| TW | 201825178 A | 7/2018 | |
| WO | WO 2014/045861 A1 | 3/2014 | |
| WO | WO 2016/152487 A1 | 9/2016 | |
| WO | WO 2018/047694 A1 | 3/2018 | |
| WO | WO-2018181241 A1 * | 10/2018 | C01G 23/053 |

OTHER PUBLICATIONS

Du et al., "Visible-light-induced photo-Fenton process for the facile degradation of metronidazole by Fe/Si codoped TiO2", The Royal Society of Chemistry, 2018, vol. 8, pp. 40022-40034.
International Search Report for PCT/JP2020/007165 mailed on Apr. 21, 2020.
International Search Report for PCT/JP2020/007204 mailed on Apr. 21, 2020.
Karvinen, "The effects of trace elements on the crystal properties of TIO2", Solid State Sciences, 2003, vol. 5, pp. 811-819.
Li et al., "Photocatalytic Properties of TIO2 and FE(III)-, Z(II)- and SI(IV)- Doped TIO2 Nanopowders Synthesized By Sol-Gel", Eco-Materials Processing and Design, 2006, pp. 165-173.
Written Opinion of the International Searching Authority for PCT/JP2020/007165 (PCT/ISA/237) mailed on Apr. 21, 2020.

(Continued)

*Primary Examiner* — Brian A McCaig
(74) *Attorney, Agent, or Firm* — Birch, Stewart, Kolasch & Birch, LLP

(57) ABSTRACT

Provided are titanium oxide fine particles capable of enhancing the photocatalytic activity of a photocatalyst when mixed with such photocatalyst. There are provided titanium oxide fine particles with at least an iron component and a silicon component solid-dissolved therein, in which the iron and silicon components are each contained in an amount of 1 to 1,000 in terms of a molar ratio to titanium (Ti/Fe or Ti/Si); and a titanium oxide fine particle dispersion liquid in which these titanium oxide fine particles are dispersed in an aqueous dispersion medium.

9 Claims, No Drawings

(56) References Cited

OTHER PUBLICATIONS

Written Opinion of the International Searching Authority for PCT/JP2020/007204 (PCT/ISA/237) mailed on Apr. 21, 2020.
Japanese Office Action for Japanese Application No. 2019-038452, dated Jan. 4, 2022, with English translation.
Chinese Office Action and Search Report for Chinese Application No. 202080018251.6, dated Feb. 8, 2023, with an English translation.
Taiwanese Office Action and Search Report for Taiwanese Application No. 109106859, dated Oct. 25, 2023, with an English translation.

* cited by examiner

TITANIUM OXIDE FINE PARTICLES, DISPERSION LIQUID THEREOF, AND METHOD FOR PRODUCING DISPERSION LIQUID

TECHNICAL FIELD

The present invention relates to titanium oxide fine particles with an iron component and a silicon component solid-dissolved therein; a dispersion liquid thereof; and a method for producing such dispersion liquid.

BACKGROUND ART

Photocatalysts are often used for the purposes of, for example, cleaning, deodorizing and bringing about an antibacterial effect on the surface of a base material. A photocatalytic reaction refers to a reaction caused by excited electrons and positive holes that have occurred as a result of having a photocatalyst absorb a light. It is considered that the decomposition of an organic substance by a photocatalyst is mainly triggered by the following mechanisms [1] or [2].

[1] The excited electrons and positive holes that have been generated undergo a redox reaction with the oxygen and water that have adsorbed to the surface of the photocatalyst, so that one or more active species that have occurred due to the redox reaction shall decompose the organic substance.

[2] The positive holes that have been generated decompose the organic substance that have adsorbed to the surface of the photocatalyst by directly oxidizing the same.

As for the application of the above photocatalytic action, studies are being conducted on uses not only outdoors where ultraviolet light is available, but also indoors where a light source(s) mostly composed of lights in the visible region (wavelength 400 to 800 nm), such as a fluorescent light, are used for illumination. For example, as a visible light responsive photocatalyst, there has been developed a tungsten oxide photocatalyst body (JP-A-2009-148700: Patent document 1).

As a method for enhancing the visible light activity of a photocatalyst utilizing titanium oxide, there are known, for example, a method of having iron and/or copper supported on the surfaces of titanium oxide fine particles and titanium oxide fine particles doped with a metal (e.g. JP-A-2012-210632: Patent document 2, JP-A-2010-104913: Patent document 3, JP-A-2011-240247: Patent document 4, JP-A-Hei-7-303835: Patent document 5); a method where there are at first separately prepared titanium oxide fine particles with tin and a visible light activity-enhancing transition metal solid-dissolved (doped) therein and titanium oxide fine particles with copper solid-dissolved therein, followed by mixing them before use (WO2014/045861: Patent document 6); and a method where there are at first separately prepared titanium oxide fine particles with tin and a visible light responsiveness-enhancing transition metal solid-dissolved therein and titanium oxide fine particles with an iron group element solid-dissolved therein, followed by mixing them before use (WO2016/152487: Patent document 7).

As a result of using a photocatalyst film formed with a visible light-responsive photocatalyst titanium oxide fine particle dispersion liquid that is obtained by mixing the separately prepared titanium oxide fine particles with tin and a visible light activity-enhancing transition metal solid-dissolved therein and the separately prepared titanium oxide fine particles with an iron group element solid-dissolved therein as is the case with the latter method (Patent document 7), while a high decomposition activity can be achieved even when a decomposition substrate is at a low concentration, which has been difficult under a condition where only lights in the visible region are available, further enhancement in visible light activity are required to actually feel a satisfactory effect(s) under a real environment.

PRIOR ART DOCUMENTS

Patent Documents

Patent document 1: JP-A-2009-148700
Patent document 2: JP-A-2012-210632
Patent document 3: JP-A-2010-104913
Patent document 4: JP-A-2011-240247
Patent document 5: JP-A-Hei-7-303835
Patent document 6: WO2014/045861
Patent document 7: WO2016/152487

SUMMARY OF THE INVENTION

Problems to be Solved by the Invention

Thus, it is an object of the present invention to provide titanium oxide fine particles capable of achieving a higher photocatalytic activity when mixed with a photocatalyst than when the photocatalyst is used alone; a dispersion liquid thereof; and a method for producing such dispersion liquid.

Means to Solve the Problems

In order to enhance the activity of a photocatalyst, the inventors of the present invention precisely studied combinations of photocatalysts with various materials, and completed the invention as follows. That is, the inventors found that a photocatalytic activity higher than that when a photocatalyst is used alone was able to be achieved by mixing the photocatalyst and titanium oxide fine particles with an iron component and a silicon component solid-dissolved therein.

Therefore, the present invention is to provide the following titanium oxide with iron and silicon solid-dissolved therein; a dispersion liquid thereof; and a method for producing such dispersion liquid.

[1]
Titanium oxide fine particles with at least an iron component and a silicon component solid-dissolved therein.

[2]
The titanium oxide fine particles according to [1], wherein the iron and silicon components are each contained in an amount of 1 to 1,000 in terms of a molar ratio to titanium (Ti/Fe or Ti/Si).

[3]
The titanium oxide fine particles according to [1] or [2], wherein the titanium oxide fine particles further have at least one transition metal component selected from molybdenum, tungsten and vanadium solid-dissolved therein.

[4]
A titanium oxide fine particle dispersion liquid wherein the titanium oxide fine particles according to any one of [1] to [3] which are the titanium oxide fine particles with the iron and silicon components solid-dissolved therein are dispersed in an aqueous dispersion medium.

[5]
A method for producing a dispersion liquid of titanium oxide fine particles with an iron component and a silicon component solid-dissolved therein, comprising:

(1) a step of producing an iron component and silicon component-containing peroxotitanic acid solution from a raw material titanium compound, iron compound, silicon compound, basic substance, hydrogen peroxide and aqueous dispersion medium; and
(2) a step of obtaining a dispersion liquid of titanium oxide fine particles with the iron component and silicon component solid-dissolved therein, by heating the iron component and silicon component-containing peroxotitanic acid solution produced in the step (1) at 80 to 250° C. under a controlled pressure.

Effects of the Invention

According to the present invention, there can be provided titanium oxide fine particles with an iron component and a silicon component solid-dissolved therein that are capable of enhancing photocatalytic activity when mixed with a photocatalyst; a dispersion liquid thereof; and a method for producing such dispersion liquid.

MODE FOR CARRYING OUT THE INVENTION

The present invention is described in detail hereunder.

Titanium oxide fine particles of the present invention are titanium oxide fine particles with at least an iron component and a silicon component solid-dissolved therein, and are capable of enhancing photocatalytic activity when mixed with a photocatalyst; particularly, it is desired that the titanium oxide fine particles of the present invention be used in the form of a dispersion liquid.

The dispersion liquid of the titanium oxide fine particles of the present invention with an iron component and a silicon component solid-dissolved therein is such that the titanium oxide fine particles with an iron component and a silicon component solid-dissolved therein are dispersed in an aqueous dispersion medium.

Here, in this specification, a solid solution refers to that having a phase where atoms at lattice points in a certain crystal phase have been substituted by other atoms or where other atoms have entered lattice spacings i.e. a mixed phase regarded as one with a different substance(s) dissolved into a certain crystal phase, and being a homogeneous phase as a crystal phase. A solid solution where solvent atoms at lattice points have been substituted by solute atoms is called a substitutional solid solution, and a solid solution where solute atoms have entered lattice spacings is called an interstitial solid solution; in this specification, a solid solution refers to both of them.

In the case of the first titanium oxide fine particles of the present invention, the titanium oxide fine particles are characterized by forming a solid solution with iron atoms and silicon atoms. The solid solution may be either substitutional or interstitial. A substitutional solid solution of titanium oxide is formed by having titanium sites of a titanium oxide crystal substituted by various metal atoms; an interstitial solid solution of titanium oxide is formed by having various metal atoms enter the lattice spacings of a titanium oxide crystal. After various metal atoms have been solid-dissolved into titanium oxide, when measuring the crystal phase by X-ray diffraction or the like, there will only be observed the peak of the crystal phase of titanium oxide, whereas there will not be observed peaks of compounds derived from various metal atoms added.

While there are no particular restrictions on a method for solid-dissolving dissimilar metals into a metal oxide crystal, there may be listed, for example, a gas phase method (e.g. CVD method, PVD method), a liquid phase method (e.g. hydrothermal method, sol-gel process) and a solid phase method (e.g. high-temperature firing).

As a crystal phase of titanium oxide fine particles, there are generally known three of them which are the rutile-type, anatase-type and brookite-type. It is preferred that the titanium oxide fine particles mainly employ the rutile-type or anatase-type. Here, the expression "mainly" refers to a condition where the titanium oxide fine particles having such particular crystal phase(s) are contained in the titanium oxide fine particles as a whole by an amount of not smaller than 50% by mass, preferably not smaller than 70% by mass, even more preferably not smaller than 90% by mass, or even 100% by mass.

Further, as a dispersion medium of the dispersion liquid, an aqueous solvent is normally used, and it is preferred that water be used. However, there may also be used a mixed solvent of water and a hydrophilic organic solvent which is to be mixed with water at any ratio. As water, preferred are purified waters such as a filtrate water, a deionized water, a distilled water and a pure water. Moreover, as the hydrophilic organic solvent, preferred are, for example, alcohols such as methanol, ethanol and isopropanol; glycols such as ethylene glycol; and glycol ethers such as ethylene glycol monomethyl ether, ethylene glycol monoethyl ether and propylene glycol-n-propyl ether. If using the mixed solvent, it is preferred that a ratio of the hydrophilic organic solvent in the mixed solvent be larger than 0% by mass, but not larger than 50% by mass; more preferably larger than 0% by mass, but not larger than 20% by mass; even more preferably larger than 0% by mass, but not larger than 10% by mass.

The titanium oxide fine particles of the present invention are characterized by having an iron component and a silicon component solid-dissolved therein.

The iron component to be solid-dissolved in the titanium oxide fine particles may be that derived from an iron compound, examples of which include elemental iron as a metal (Fe), an iron oxide ($Fe_2O_3$, $Fe_3O_4$), an iron hydroxide, an iron oxyhydroxide (FeO(OH)), an iron chloride ($FeCl_2$, $FeCl_3$), an iron nitrate ($Fe(NO_3)_3$), an iron sulfate ($FeSO_4$, $Fe_2(SO_4)_3$), an iron halide (e.g. Br, I) and an iron complex compound; there may be used one of them or a combination of two or more of them. Particularly, it is preferred that there be used an iron oxide ($Fe_2O_3$, $Fe_3O_4$), an iron oxyhydroxide (FeO(OH)), an iron chloride ($FeCl_2$, $FeCl_3$), an iron nitrate ($Fe(NO_3)_3$) and an iron sulfate ($FeSO_4$, $Fe_2(SO_4)_3$).

The iron component is contained in the titanium oxide fine particles by an amount of 1 to 1,000, preferably 2 to 200, more preferably 5 to 100, in terms of a molar ratio to titanium (Ti/Fe). This is because if the molar ratio is lower than 1 or greater than 1,000, there may be exhibited an insufficient effect of enhancing photocatalytic activity.

The silicon component to be solid-dissolved in the titanium oxide fine particles may be that derived from a silicon compound, examples of which include elemental silicon as a metal (Si), a silicon oxide (SiO, $SiO_2$), a silicon alkoxide ($Si(OCH_3)_4$, $Si(OC_2H_5)_4$, $Si(OCH(CH_3)_2)_4$) and a silicate (sodium salt, potassium salt); there may be used one of them or a combination of two or more of them. Particularly, it is preferred that there be used a silicate (sodium silicate).

The silicon component is contained in the titanium oxide fine particles by an amount of 1 to 1,000, preferably 2 to 200, more preferably 3 to 100, in terms of a molar ratio to titanium (Ti/Si). This is because if the molar ratio is lower than 1 or greater than 1,000, there may be exhibited an insufficient effect of enhancing photocatalytic activity.

In order to enhance visible light responsiveness, a transition metal component(s) other than iron may be solid-dissolved in the titanium oxide fine particles of the present invention; in such case, while the amount of the transition metal component(s) contained may be appropriately determined based on the type of the transition metal component, it is preferred that the amount thereof be 1 to 10,000 in terms of a molar ratio to titanium (Ti/transition metal). As a transition metal component(s) other than iron, preferred are visible light responsiveness-enhancing transition metal components, specific examples of which include vanadium, chromium, manganese, niobium, molybdenum, rhodium, tungsten and cerium; even among these examples, it is preferred that the transition metal component be selected from molybdenum, tungsten and vanadium.

When molybdenum is selected as the transition metal component to be solid-dissolved in the titanium oxide fine particles, it will suffice if the molybdenum component is that derived from a molybdenum compound similar to those in the case of a later-described first titanium oxide fine particles.

The molybdenum component is contained in the titanium oxide fine particles by an amount of 1 to 10,000, preferably 5 to 5,000, more preferably 20 to 1,000, in terms of a molar ratio to titanium (Ti/Mo). This is because if the molar ratio is lower than 1, a photocatalytic effect may not be sufficiently exhibited as titanium oxide is now contained at a lower rate; and if the molar ratio is greater than 10,000, an insufficient visible light responsiveness may be observed.

When tungsten is selected as the transition metal component to be solid-dissolved in the titanium oxide fine particles, it will suffice if the tungsten component is that derived from a tungsten compound similar to those in the case of the later-described first titanium oxide fine particles.

The tungsten component is contained in the titanium oxide fine particles by an amount of 1 to 10,000, preferably 5 to 5,000, more preferably 20 to 1,000, in terms of a molar ratio to titanium (Ti/W). This is because if the molar ratio is lower than 1, a photocatalytic effect may not be sufficiently exhibited as titanium oxide is now contained at a lower rate; and if the molar ratio is greater than 10,000, an insufficient visible light responsiveness may be observed.

When vanadium is selected as the transition metal component to be solid-dissolved in the titanium oxide fine particles, it will suffice if the vanadium component is that derived from a vanadium compound similar to those in the case of the later-described first titanium oxide fine particles.

The vanadium component is contained in the titanium oxide fine particles by an amount of 1 to 10,000, preferably 10 to 10,000, more preferably 100 to 10,000, in terms of a molar ratio to titanium (Ti/V). This is because if the molar ratio is lower than 1, a photocatalytic effect may not be sufficiently exhibited as titanium oxide is now contained at a lower rate; and if the molar ratio is greater than 10,000, an insufficient visible light responsiveness may be observed.

As the transition metal component(s) to be solid-dissolved in the titanium oxide fine particles, there may also be selected multiple components from molybdenum, tungsten and vanadium. The amount of each component at that time may be selected from the above ranges. However, a molar ratio between a sum of the components and titanium [Ti/(Mo+W+V)] is not lower than 1, but lower than 10,000.

As the titanium oxide fine particles, one kind thereof may be used, or two or more kinds thereof may be used in combination. There may be achieved an effect of enhancing a visible light activity if combining two or more kinds of the titanium oxide fine particles having different visible light responsivenesses.

It is preferred that the titanium oxide fine particles in the titanium oxide fine particle dispersion liquid have a particle diameter of 5 to 30 nm, more preferably 5 to 20 nm, the particle diameter being a 50% cumulative distribution diameter (possibly referred to as $D_{50}$ hereunder) on volumetric basis that is measured by a dynamic light scattering method using a laser light. This is because if $D_{50}$ is smaller than 5 nm, an insufficient photocatalytic activity may be observed; and if $D_{50}$ is greater than 30 nm, the dispersion liquid may be opaque.

Further, as for a 90% cumulative distribution diameter (possibly referred to as $D_{90}$ hereunder) on volumetric basis of the titanium oxide fine particles, it is preferred that such diameter be 5 to 100 nm, more preferably 5 to 80 nm. This is because if $D_{90}$ is smaller than 5 nm, an insufficient photocatalytic activity may be observed; and if $D_{90}$ is greater than 100 nm, the dispersion liquid may be opaque.

Here, as a device for measuring $D_{50}$ and $D_{90}$ of the titanium oxide fine particles, there may be used, for example, ELSZ-2000ZS (by Otsuka Electronics Co., Ltd.), NANOTRAC UPA-EX150 (by Nikkiso Co., Ltd.) or LA-910 (by HORIBA, Ltd.).

It is preferred that a concentration of the titanium oxide fine particles in the titanium oxide fine particle dispersion liquid be 0.01 to 20% by mass, particularly preferably 0.5 to 10% by mass, in terms of ease in producing a photocatalyst thin film having a given thickness.

Here, a method for measuring the concentration of the titanium oxide fine particle dispersion liquid is such that part of the titanium oxide fine particle dispersion liquid is sampled, and the concentration is then calculated with the following formula based on the mass of a non-volatile content (titanium oxide fine particles) after volatilizing the solvent by performing heating at 105° C. for 3 hours and the mass of the titanium oxide fine particle dispersion liquid sampled.

Concentration of titanium oxide fine particle dispersion liquid (%)=[mass of not-volatile content (g)/mass of titanium oxide fine particle dispersion liquid (g)]×100

<Method for Producing Dispersion Liquid of Titanium Oxide Fine Particles with Iron and Silicon Solid-Dissolved Therein>

As a method for producing the dispersion liquid of the titanium oxide fine particles of the present invention with the iron component and the silicon component solid-dissolved therein, there may be specifically employed a production method having the following steps (1) and (2).

Step (1):

In a step (1), an iron component and silicon component-containing peroxotitanic acid solution is produced by reacting a raw material titanium compound, iron compound, silicon compound, basic substance and hydrogen peroxide in an aqueous dispersion medium.

As a reaction method, there may be employed any of the following methods (i) to (iii).

(i) A method where the iron compound and silicon compound are added and dissolved with respect to the raw material titanium compound and basic substance in the aqueous dispersion medium to obtain an iron and silicon-containing titanium hydroxide, followed by removing impurity ions other than metal ions to be contained, and then adding hydrogen peroxide to obtain an iron component and silicon component-containing peroxotitanic acid.

(ii) A method where the basic substance is added to the raw material titanium compound in the aqueous dispersion medium to obtain a titanium hydroxide, impurity ions other than metal ions to be contained are then removed, followed by adding the iron compound and silicon compound, and then adding hydrogen peroxide to obtain an iron component and silicon component-containing peroxotitanic acid.

(iii) A method where the basic substance is added to the raw material titanium compound in the aqueous dispersion medium to obtain a titanium hydroxide, impurity ions other than metal ions to be contained are then removed, hydrogen peroxide is then added to obtain a peroxotitanic acid, followed by adding the iron compound and silicon compound to obtain an iron component and silicon component-containing peroxotitanic acid.

Here, in the first part of the description of the method (i), "the raw material titanium compound and basic substance in the aqueous dispersion medium" may be prepared as two separate liquids of aqueous dispersion media such as "an aqueous dispersion medium with the raw material titanium compound dispersed therein" and "an aqueous dispersion medium with the basic substance dispersed therein," and each of the iron compound and silicon compound may then be dissolved in one or both of these two liquids in accordance with the solubility of each of the iron compound and silicon compound in these two liquids before mixing the two.

In this way, after obtaining the iron component and silicon component-containing peroxotitanic acid, by subjecting such peroxotitanic acid to a later-described hydrothermal reaction in the step (2), there can be obtained titanium oxide fine particles with the iron component and silicon component solid-dissolved in titanium oxide.

Here, examples of the raw material titanium compound include titanium chlorides; inorganic acid salts of titanium, such as titanium nitrate and titanium sulfate; organic acid salts of titanium, such as titanium formate, titanium citrate, titanium oxalate, titanium lactate and titanium glycolate; and titanium hydroxides precipitated by hydrolysis reactions as a result of adding alkalis to aqueous solutions of these chlorides and salts. There may be used one of them or a combination of two or more of them. Particularly, it is preferred that titanium chlorides ($TiCl_3$, $TiCl_4$) be used.

As for each of the iron compound, silicon compound and aqueous dispersion medium, those described above are used at the compositions described above. Here, it is preferred that a concentration of a raw material titanium compound aqueous solution composed of the raw material titanium compound and aqueous dispersion medium be not higher than 60% by mass, particularly preferably not higher than 30% by mass. A lower limit of the concentration is appropriately determined; it is preferred that the lower limit be not lower than 1% by mass in general.

The basic substance is to smoothly turn the raw material titanium compound into a titanium hydroxide, examples of which include hydroxides of alkali metals or alkaline earth metals, such as sodium hydroxide and potassium hydroxide; and amine compounds such as ammonia, alkanolamine and alkylamine. Among these examples, it is particularly preferred that ammonia be used and be used in such an amount that the pH level of the raw material titanium compound aqueous solution will be 7 or higher, particularly 7 to 10. Here, the basic substance, together with the aqueous dispersion medium, may be turned into an aqueous solution having a proper concentration before use.

Hydrogen peroxide is to convert the raw material titanium compound or titanium hydroxide into a peroxotitanic acid i.e. a titanium oxide compound having a Ti—O—O—Ti bond, and is normally used in the form of a hydrogen peroxide water. It is preferred that hydrogen peroxide be added in an amount of 1.5 to 20 times the molar amount of a total substance amount of titanium, iron and silicon. Further, in the reaction where hydrogen peroxide is added to turn the raw material titanium compound or titanium hydroxide into the peroxotitanic acid, it is preferred that a reaction temperature be 5 to 80° C., and that a reaction time be 30 min to 24 hours.

The iron component and silicon component-containing peroxotitanic acid solution thus obtained may also contain an alkaline substance or acidic substance for the purpose of pH adjustment or the like. Here, examples of the alkaline substance include ammonia, sodium hydroxide, calcium hydroxide and alkylamine; examples of the acidic substance include inorganic acids such as sulfuric acid, nitric acid, hydrochloric acid, carbonic acid, phosphoric acid and hydrogen peroxide, and organic acids such as formic acid, citric acid, oxalic acid, lactic acid and glycolic acid. In this case, it is preferred that pH of the iron component and silicon component-containing peroxotitanic acid solution obtained be 1 to 9, particularly preferably 4 to 7, in terms of safety in handling.

Step (2):

In the step (2), the iron component and silicon component-containing peroxotitanic acid solution obtained in the step (1) is subjected to a hydrothermal reaction under a controlled pressure and at a temperature of 80 to 250° C., preferably 100 to 250° C. for 0.01 to 24 hours. An appropriate reaction temperature is 80 to 250° C. in terms of reaction efficiency and reaction controllability; as a result, the iron component and silicon component-containing peroxotitanic acid will be converted into titanium oxide fine particles with the iron component and silicon component solid-dissolved therein. Here, the expression "under a controlled pressure" refers to a condition where if the reaction temperature is greater than the boiling point of the dispersion medium, a pressure will be applied in a proper manner such that the reaction temperature will be maintained; and even a condition where if the reaction temperature is not higher than the boiling point of the dispersion medium, atmospheric pressure will be used for control. The pressure employed here is normally about 0.12 to 4.5 MPa, preferably about 0.15 to 4.5 MPa, more preferably about 0.20 to 4.5 MPa. The reaction time is preferably 1 min to 24 hours. By this step (2), there can be obtained a dispersion liquid of the titanium oxide fine particles with the iron component and silicon component solid-dissolved therein.

It is preferred that the particle diameter of the titanium oxide fine particles obtained here fall into the ranges described above; the particle diameter can be controlled by adjusting the reaction condition(s), for example, the particle diameter can be made smaller by shortening the reaction time and a temperature rise time.

<Use of Titanium Oxide Fine Particles with Iron Component and Silicon Component Solid-Dissolved Therein>

The titanium oxide fine particles of the present invention with the iron component and silicon component solid-dissolved therein are capable of enhancing photocatalytic activity when mixed into a photocatalyst.

In the present invention, photocatalyst is a collective term referring to a substance(s) exhibiting photocatalytic action when irradiated with a light having an energy of a given bandgap or larger. As such substance(s), there may be used one of or a combination of two or more of fine particles of known metal oxide semiconductors such as titanium oxide, tungsten oxide, zinc oxide, tin oxide, iron oxide, bismuth oxide, bismuth vanadate and strontium titanate. Particularly, it is desired that there be used titanium oxide fine particles that have an especially high photocatalytic action under an irradiation with a light including an ultraviolet light having a wavelength of not longer than 400 nm; are chemically stable; and can be relatively easily synthesized into nanosized particles which can then be relatively easily dispersed into a solvent as well. Here, in this specification, in order to distinguish the titanium oxide fine particles of the present invention with the iron component and silicon component solid-dissolved therein from titanium oxide fine particles for enhancing photocatalytic activity, the titanium oxide fine particles for enhancing photocatalytic activity may be referred to as "first titanium oxide fine particles," whereas the titanium oxide fine particles of the present invention with the iron component and silicon component solid-dissolved therein may be referred to as "second titanium oxide fine particles."

As a crystal phase of titanium oxide fine particles, there are generally known three of them which are the rutile-type, anatase-type and brookite-type. It is preferred that as are the cases with the aforementioned titanium oxide fine particles, the first titanium oxide fine particles employ titanium oxide fine particles whose crystal phases are mainly those of the anatase-type or rutile-type. Here, the expression "mainly" refers to a condition where the particular crystal phase(s) are contained in the whole crystals of the titanium oxide fine particles by an amount of not smaller than 50% by mass in general, preferably not smaller than 70% by mass, even more preferably not smaller than 90% by mass, or even 100% by mass.

As the first titanium oxide fine particles, in order to enhance their photocatalytic activity, there may be used those with a metal compound(s) such as a metal compound of platinum, gold, palladium, iron, copper or nickel supported on titanium oxide fine particles; and those with an element(s) such tin, nitrogen, sulfur or carbon solid-dissolved (doped) therein.

As the first titanium oxide fine particles, particularly preferred are titanium oxide fine particles with a tin component and a transition metal component other than iron solid-dissolved therein. As a transition metal component other than iron, a visible light responsiveness-enhancing transition metal component is more preferred. Such transition metal other than iron is an element selected from the group 3 to group 11 in the periodic table; as a visible light responsiveness-enhancing transition metal component, there may be selected from vanadium, chromium, manganese, niobium, molybdenum, rhodium, tungsten, cerium and the like, among which molybdenum, tungsten and vanadium are preferably selected.

While the tin component to be solid-dissolved in the first titanium oxide fine particles is to enhance the visible light responsiveness of a photocatalyst thin film, it will suffice if the tin component is that derived from a tin compound, examples of which include elemental tin as a metal (Sn), a tin oxide (SnO, $SnO_2$), a tin hydroxide, a tin chloride ($SnCl_2$, $SnCl_4$), a tin nitrate ($Sn(NO_3)_2$), a tin sulfate ($SnSO_4$), a tin halide (e.g. Br, I), a salt of tin-oxoacid (stannate) ($Na_2SnO_3$, $K_2SnO_3$) and a tin complex compound; there may be used one of them or a combination of two or more of them. Particularly, it is preferred that there be used a tin oxide (SnO, $SnO_2$), a tin chloride ($SnCl_2$, $SnCl_4$), a tin sulfate ($SnSO_4$) and a salt of tin-oxoacid (stannate) ($Na_2SnO_3$, $K_2SnO_3$).

The tin component is contained in the first titanium oxide fine particles by an amount of 1 to 1,000, preferably 5 to 500, more preferably 5 to 100, in terms of a molar ratio to titanium (Ti/Sn). This is because if the molar ratio is lower than 1, a photocatalytic effect may not be sufficiently exhibited as titanium oxide is now contained at a lower rate; and if the molar ratio is greater than 1,000, an insufficient visible light responsiveness may be observed.

The transition metal component to be solid-dissolved in the first titanium oxide fine particles may be that derived from a corresponding transition metal compound, examples of which include a metal, an oxide, a hydroxide, a chloride, a nitrate, a sulfate, a halide, a salt of oxoacid and various complex compounds; there may be used one of them or a combination of two or more of them.

The amount of the transition metal component(s) contained in the first titanium oxide fine particles may be appropriately determined based on the type of the transition metal component; it is preferred that the amount thereof be 1 to 10,000 in terms of a molar ratio to titanium (Ti/transition metal).

When molybdenum is selected as the transition metal component to be solid-dissolved in the first titanium oxide fine particles, it will suffice if the molybdenum component is that derived from a molybdenum compound, examples of which include elemental molybdenum as a metal (Mo), a molybdenum oxide ($MoO_2$, $MoO_3$), a molybdenum hydroxide, a molybdenum chloride ($MoCl_3$, $MoCl_5$), a molybdenum nitrate, a molybdenum sulfate, a molybdenum halide (e.g. Br, I), a molybdic acid and salt of molybdenum-oxoacid (molybdate) ($H_2MoO_4$, $Na_2MoO_4$, $K_2MoO_4$), and a molybdenum complex compound; there may be used one of them or a combination of two or more of them. Particularly, it is preferred that there be used a molybdenum oxide ($MoO_2$, $MoO_3$), a molybdenum chloride ($MoCl_3$, $MoCl_5$) and a salt of molybdenum-oxoacid (molybdate) ($H_2MoO_4$, $Na_2MoO_4$, $K_2MoO_4$).

The molybdenum component is contained in the first titanium oxide fine particles by an amount of 1 to 10,000, preferably 5 to 5,000, more preferably 20 to 1,000, in terms of a molar ratio to titanium (Ti/Mo). This is because if the molar ratio is lower than 1, a photocatalytic effect may not be sufficiently exhibited as titanium oxide is now contained at a lower rate; and if the molar ratio is greater than 10,000, an insufficient visible light responsiveness may be observed.

When tungsten is selected as the transition metal component to be solid-dissolved in the first titanium oxide fine particles, it will suffice if the tungsten component is that derived from a tungsten compound, examples of which include elemental tungsten as a metal (W), a tungsten oxide ($WO_3$), a tungsten hydroxide, a tungsten chloride ($WCl_4$, $WCl_6$), a tungsten nitrate, a tungsten sulfate, a tungsten halide (e.g. Br, I), a tungstic acid and salt of tungsten-oxoacid (tungstate) ($H_2WO_4$, $Na_2WO_4$, $K_2WO_4$), and a tungsten complex compound; there may be used one of them or a combination of two or more of them. Particularly, it is preferred that there be used a tungsten oxide ($WO_3$), a tungsten chloride ($WCl_4$, $WCl_6$) and a salt of tungsten-oxoacid (tungstate) ($Na_2WO_4$, $K_2WO_4$).

The tungsten component is contained in the first titanium oxide fine particles by an amount of 1 to 10,000, preferably 5 to 5,000, more preferably 20 to 2,000, in terms of a molar ratio to titanium (Ti/W). This is because if the molar ratio is lower than 1, a photocatalytic effect may not be sufficiently exhibited as titanium oxide is now contained at a lower rate; and if the molar ratio is greater than 10,000, an insufficient visible light responsiveness may be observed.

When vanadium is selected as the transition metal component to be solid-dissolved in the first titanium oxide fine particles, it will suffice if the vanadium component is that derived from a vanadium compound, examples of which include elemental vanadium as a metal (V), a vanadium oxide (VO, $V_2O_3$, $VO_2$, $V_2O_5$), a vanadium hydroxide, a vanadium chloride ($VCl_5$), a vanadium oxychloride ($VOCl_3$), a vanadium nitrate, a vanadium sulfate, a vanadyl sulfate ($VOSO_4$), a vanadium halide (Br, I), a salt of vanadium-oxoacid (vanadate) ($Na_3VO_4$, $K_3VO_4$, $KVO_3$), and a vanadium complex compound; there may be used one of them or a combination of two or more of them. Particularly, it is preferred that there be used a vanadium oxide ($V_2O_3$, $V_2O_5$), a vanadium chloride ($VCl_5$), a vanadium oxychloride ($VOCl_3$), a vanadyl sulfate ($VOSO_4$), and a salt of vanadium-oxoacid (vanadate) ($Na_3VO_4$, $K_3VO_4$, $KVO_3$).

The vanadium component is contained in the first titanium oxide fine particles by an amount of 1 to 10,000, preferably 10 to 10,000, more preferably 100 to 10,000, in terms of a molar ratio to titanium (Ti/V). This is because if the molar ratio is lower than 1, a photocatalytic effect may not be sufficiently exhibited as titanium oxide is now contained at a lower rate; and if the molar ratio is greater than 10,000, an insufficient visible light responsiveness may be observed.

As the transition metal component(s) to be solid-dissolved in the first titanium oxide fine particles, there may also be selected multiple components from molybdenum, tungsten and vanadium. The amount of each component at that time may be selected from the above ranges. However, a molar ratio between a sum of the components and titanium [Ti/(Mo+W+V)] is not lower than 1, but lower than 10,000.

As the first titanium oxide fine particles, one kind thereof may be used, or two or more kinds thereof may be used in combination. There may be achieved an effect of enhancing a visible light activity if combining two or more kinds of the first titanium oxide fine particles having different visible light responsivenesses.

As an aqueous dispersion medium of a photocatalyst fine particle dispersion liquid, an aqueous solvent is normally used, and it is preferred that water be used. However, there may also be used a mixed solvent of water and a hydrophilic organic solvent which is to be mixed with water at any ratio. As water, preferred are, for example, a deionized water, a distilled water and a pure water. Moreover, as the hydrophilic organic solvent, preferred are, for example, alcohols such as methanol, ethanol and isopropanol; glycols such as ethylene glycol; and glycol ethers such as ethylene glycol monomethyl ether, ethylene glycol monoethyl ether and propylene glycol-n-propyl ether. If using the mixed solvent, it is preferred that a ratio of the hydrophilic organic solvent in the mixed solvent be larger than 0% by mass, but not larger than 50% by mass; more preferably larger than 0% by mass, but not larger than 20% by mass; even more preferably larger than 0% by mass, but not larger than 10% by mass.

It is preferred that a distribution particle diameter of the titanium oxide fine particles in a dispersion liquid of the first titanium oxide fine particles be 5 to 30 nm, more preferably 5 to 20 nm, the particle diameter being a 50% cumulative distribution diameter (possibly referred to as $D_{50}$ hereunder) on volumetric basis that is measured by a dynamic light scattering method using a laser light. This is because if the average particle diameter is smaller than 5 nm, an insufficient photocatalytic activity may be observed; and if the average particle diameter is greater than 30 nm, the dispersion liquid may be opaque.

Further, as for a 90% cumulative distribution diameter (possibly referred to as $D_{90}$ hereunder) on volumetric basis, it is preferred that such diameter be 5 to 100 nm, more preferably 5 to 80 nm. This is because if $D_{90}$ is smaller than 5 nm, an insufficient photocatalytic activity may be observed; and if $D_{90}$ is greater than 100 nm, the dispersion liquid may be opaque.

Here, a device for measuring $D_{50}$ and $D_{90}$ of the first titanium oxide fine particles is described as above.

It is preferred that a concentration of the titanium oxide fine particles in the first titanium oxide fine particle dispersion liquid be 0.01 to 30% by mass, particularly preferably 0.5 to 20% by mass, in terms of ease in producing a later-described photocatalyst thin film having a given thickness.

Here, a method for measuring the concentration of the first titanium oxide fine particle dispersion liquid is such that part of the titanium oxide fine particle dispersion liquid is sampled, and the concentration is then calculated with the following formula based on the mass of a non-volatile content (titanium oxide fine particles) after volatilizing the solvent by performing heating at 105° C. for 3 hours and the mass of the titanium oxide fine particle dispersion liquid sampled.

Concentration of titanium oxide fine particle dispersion liquid (%)=[mass of not-volatile content (g)/mass of titanium oxide fine particle dispersion liquid (g)]×100

The first titanium oxide fine particle dispersion liquid can be produced by a known method; a dispersion liquid of a titanium oxide fine particle mixture can be obtained by mixing two kinds of titanium oxide fine particle dispersion liquids which are the first titanium oxide fine particle dispersion liquid and a dispersion liquid of titanium oxide fine particles with iron and silicon solid-dissolved therein.

There are no particular restrictions on a mixing method, as long as the method employed is capable of uniformly mixing the two kinds of dispersion liquids; for example, mixing may be performed by carrying out stirring using a commonly available stirrer.

It is preferred that a mixing ratio therebetween be 99 to 0.1, more preferably 99 to 1, even more preferably 99 to 3, in terms of a mass ratio therebetween [first titanium oxide fine particles/second titanium oxide fine particles]. This is because if such mass ratio is greater than 99 or lower than 0.1, there may be achieved an insufficient effect of enhancing the photocatalytic activity of the first titanium oxide fine particles.

Here, a distribution particle diameter of the mixture of the first and second titanium oxide fine particles in the titanium oxide fine particle mixed dispersion liquid is 5 to 100 nm, preferably 5 to 30 nm, more preferably 5 to 20 nm, the distribution particle diameter being a 50% cumulative distribution diameter (possibly referred to as $D_{50}$ hereunder) on volumetric basis that is measured by a dynamic light scattering method using a laser light. This is because if $D_{50}$ is smaller than 5 nm, an insufficient photocatalytic activity may be observed; and if $D_{50}$ is greater than 100 nm, the dispersion liquid may be opaque.

Further, as for a 90% cumulative distribution diameter (possibly referred to as $D_{90}$ hereunder) on volumetric basis, it is preferred that such diameter be 5 to 100 nm, more preferably 5 to 80 nm. This is because if $D_{90}$ is smaller than 5 nm, an insufficient photocatalytic activity may be observed; and if $D_{90}$ is greater than 100 nm, the dispersion liquid may be opaque.

Here, a device for measuring $D_{50}$ and $D_{90}$ of the mixture of the first titanium oxide fine particles and the second titanium oxide fine particles is described as above.

Further, a binder may also be added to the titanium oxide fine particle mixed dispersion liquid for the purpose of making it easy to apply the dispersion liquid to the surfaces of later-described various members, and allow the dispersion liquid to adhere thereto. Examples of the binder include metal compound-based binders containing silicon, aluminum, titanium, zirconium or the like; and organic resin-based binders containing an acrylic resin, a urethane resin or the like.

It is preferred that the binder be added and used in a manner such that a mass ratio between the binder and the titanium oxide fine particle mixture [titanium oxide fine particle mixture/binder] will fall into a range of 99 to 0.01, more preferably 9 to 0.1, even more preferably 2.5 to 0.4. This is because if the mass ratio is greater than 99, the photocatalyst and the titanium oxide fine particles may adhere to the surfaces of various members in an insufficient manner; and if the mass ratio is lower than 0.01, an insufficient photocatalytic activity may be observed.

Particularly, in order to obtain an excellent photocatalyst thin film having a high photocatalytic action and transparency, it is preferred that a silicon compound-based binder be added and used in a manner such that the mass ratio (titanium oxide fine particle mixture/silicon compound-based binder) will fall into the range of 99 to 0.01, more preferably 9 to 0.1, even more preferably 2.5 to 0.4. Here, the silicon compound-based binder refers to a colloid dispersion liquid, solution or emulsion of a solid or liquid silicon compound capable of being contained in an aqueous dispersion medium, specific examples of which include a colloidal silica (preferable particle size 1 to 150 nm); solutions of silicate salts such as silicate; silane and siloxane hydrolysate emulsions; a silicone resin emulsion; and emulsions of copolymers of silicone resins and other resins, such as a silicone-acrylic resin copolymer and a silicone-urethane resin copolymer.

The mass of the first titanium oxide fine particles and the second titanium oxide fine particles that are contained in the titanium oxide fine particle mixed dispersion liquid can be calculated from the mass and concentration of each of the fine particle dispersion liquids. Here, a method for measuring the concentration of each fine particle dispersion liquid is such that part of each fine particle dispersion liquid is sampled, and the concentration is then calculated with the following formula based on the mass of a non-volatile content (each type of fine particles) after volatilizing the solvent by performing heating at 105° C. for 3 hours and the mass of each fine particle dispersion liquid sampled.

Concentration of each fine particle dispersion liquid (%)=[mass of not-volatile content (g)/mass of each fine particle dispersion liquid (g)]×100

As described above, it is preferred that the concentration of both the first and second titanium oxide fine particles in the titanium oxide fine particle mixed dispersion liquid thus prepared be 0.01 to 20% by mass, particularly preferably 0.5 to 10% by mass, in terms of ease in producing a photocatalyst thin film having a given thickness. As for concentration adjustment, if the concentration is higher than a desired concentration, the concentration can be lowered via dilution by adding an aqueous solvent; if the concentration is lower than a desired concentration, the concentration can be raised by either volatilizing or filtering out the aqueous solvent. Here, the concentration can be calculated in the above manner.

Further, if adding the abovementioned binder enhancing a film forming capability, it is preferred that a solution of the binder (aqueous binder solution) be added to the photocatalyst mixed dispersion liquid whose concentration has been adjusted in the above manner, so that the binder will be at a desired concertation after mixing.

<Member Having Photocatalyst Thin Film on Surface>

The titanium oxide fine particle mixed dispersion liquid can be used to form photocatalyst films on the surfaces of various members. Here, no particular restrictions are imposed on the various members; examples of the materials of the members may include organic materials and inorganic materials. They may have various shapes depending on the purposes and uses thereof.

Examples of the organic materials include synthetic resin materials such as polyvinyl chloride resin (PVC), polyethylene (PE), polypropylene (PP), polycarbonate (PC), an acrylic resin, polyacetal, a fluorocarbon resin, a silicone resin, an ethylene-vinyl acetate copolymer (EVA), an acrylonitrile-butadiene rubber (NBR), polyethylene terephthalate (PET), polyethylene naphthalate (PEN), polyvinyl butyral (PVB), an ethylene-vinyl alcohol copolymer (EVOH), a polyimide resin, polyphenylene sulfide (PPS), polyetherimide (PEI), polyetheretherimide (PEEI), polyetheretherketone (PEEK), a melamine resin, a phenolic resin and an acrylonitrile-butadiene-styrene (ABS) resin; natural materials such as a natural rubber; or semisynthetic materials of the abovelisted synthetic resin materials and natural materials. It is possible that these materials have already been turned into commercial products having given shapes and structures, such as a film, sheet, fiber material, fiber product and other molded products as well as laminates.

Examples of the inorganic materials include non-metallic inorganic materials and metallic inorganic materials. Examples of the non-metallic inorganic materials include glass, ceramics and stone materials. It is possible that these materials have already been turned into commercial products having various shapes, such as tiles, glass, mirrors, walls and decorative materials. Examples of the metallic inorganic materials include a cast iron, steel, iron, iron alloy, aluminum, aluminum alloy, nickel, nickel alloy and zinc die-cast. They may be plated with any of the above metal inorganic materials or coated with any of the above organic materials, or may be used to plate the surfaces of the above organic materials or non-metallic inorganic materials.

The titanium oxide fine particle mixed dispersion liquid is especially useful for forming a transparent photocatalyst thin film on a polymer film such as a PET film even among the various members listed above.

As a method for forming photocatalyst thin films on the surfaces of the various members, the titanium oxide fine particle mixed dispersion liquid may, for example, be applied to the surface of a member by a known application method such as spray coating and dip coating, followed by performing drying by a known drying method such as far-infrared drying, IH drying and hot-air drying. The thickness of the photocatalyst thin film may be determined variously; it is preferred that the thickness of the photocatalyst thin film normally fall into a range of 10 nm to 10 μm.

In this way, there can be formed a coating film of the titanium oxide fine particle mixture. In this case, if a binder is contained in the dispersion liquid by the aforementioned amount, there can be formed a coating film containing the titanium oxide fine particle mixture and the binder.

The photocatalyst thin film thus formed is transparent, and is capable of not only imparting a favorable photocatalytic action under lights in the ultraviolet region (wavelength 10 to 400 nm), but also achieving a superior photocatalytic action even under only lights in the visible region (wavelength 400 to 800 nm) of which a sufficient photocatalytic action has never been able to be achieved with a conventional photocatalyst. The various members with the photocatalyst thin films formed thereon decompose organic substances that have adsorbed to the surfaces thereof with the aid of the photocatalytic action, thereby bringing about, for example, a cleaning, deodorizing and antibacterial effects to the surfaces of the members.

WORKING EXAMPLES

The present invention is described in detail hereunder with reference to working and comparative examples. However, the present invention is not limited to the following working examples. Various measurements in the present invention were performed as follows.
(1) 50% and 90% Cumulative Distribution Diameters of Titanium Oxide Fine Particles in Dispersion Liquid $D_{50}$ and $D_{90}$ of the titanium oxide fine particles in the dispersion liquid were calculated as 50% and 90% cumulative distribution diameters on volumetric basis that are measured by a dynamic light scattering method using a laser light, by means of a particle size distribution measurement device (ELSZ-2000ZS by Otsuka Electronics Co., Ltd.).
(2) Acetaldehyde Gas Decomposition Capability Test of Photocatalyst Thin Film The activity of a photocatalyst thin film produced by applying the dispersion liquid and then drying the same was evaluated through a decomposition reaction of an acetaldehyde gas. The evaluation was performed by a batch-wise gas decomposition capability evaluation method.

Specifically, an evaluation sample was at first placed into a 5 L stainless cell equipped with a quartz glass window, the evaluation sample being that prepared by forming, on the entire surface of a PET film of an A4 size (210 mm×297 mm), a photocatalyst thin film containing about 20 mg of photocatalyst fine particles in terms of dry mass. This cell was then filled with an acetaldehyde gas having an initial concentration with a humidity thereof being controlled to 50%, followed by performing light irradiation with a light source provided at an upper portion of the cell. As a result of having the acetaldehyde gas decomposed by the photocatalyst on the thin film, the acetaldehyde gas concentration in the cell will decrease. There, by measuring this concentration, a decomposition amount of the acetaldehyde gas can be obtained. The acetaldehyde gas concentration was measured by a photoacoustic multi-gas monitor (product name "INNOVA1412" by LumaSense Technologies), and there was measured a time it took for the acetaldehyde gas concentration to be reduced from the initial concentration to 1 ppm. The test was performed for 24 hours from the start of the light irradiation.

In a photocatalytic activity evaluation under ultraviolet irradiation, a UV fluorescent lamp (product model number "FL10 BLB" by Toshiba Lighting & Technology Corporation) was used as a light source, and ultraviolet irradiation was carried out at an irradiance of 0.5 mW/cm$^2$. At that time, the initial concentration of the acetaldehyde in the cell was set to 20 ppm.

Further, in a photocatalytic activity evaluation under visible light irradiation, an LED (product model number "TH-211×200SW" by CCS Inc., spectral distribution: 400 to 800 nm) was used as a light source, and visible light irradiation was carried out at an illuminance of 30,000 Lx. At that time, the initial concentration of the acetaldehyde in the cell was set to 5 ppm.

(3) Identification of Crystal Phase of Photocatalyst and Titanium Oxide Fine Particles The crystal phase of the photocatalyst and titanium oxide fine particles was identified in a way where the dispersion liquid of the titanium oxide fine particles obtained was dried at 105° C. for three hours to obtain a titanium oxide fine particle powder, followed by collecting the titanium oxide fine particle powder so as to subject the same to powder X-ray diffraction analysis, using a diffraction device (product name "Benchtop X-ray diffractometer D2 PHASER" by BRUKER AXS Co., Ltd.).
(4) Preparation of Titanium Oxide Fine Particles with Iron Component and Silicon Component Solid-Dissolved Therein Working Example 1

<Preparation of Dispersion Liquid of Titanium Oxide Fine Particles with Iron and Silicon Solid-Dissolved Therein>

Iron chloride (III) was added to a 36% by mass titanium chloride (IV) aqueous solution so that Ti/Fe (molar ratio) would be 10, followed by diluting the solution thus prepared 10 times with a pure water. Next, gradually added to this aqueous solution for the purpose of neutralization and hydrolyzation was a 10% by mass ammonia water with sodium silicate already dissolved therein so that Ti/Si (molar ratio) would be 10 with respect to the Ti component in the titanium chloride (IV) aqueous solution, thereby obtaining a precipitate of an iron and silicon-containing titanium hydroxide. pH at that time was 8. The precipitate thus obtained was then deionized by repeating the addition of pure water and decantation. A 35% by mass hydrogen peroxide water was then added to the deionized precipitate of the iron and silicon-containing titanium hydroxide so that $H_2O_2$/(Ti+Fe+Si) (molar ratio) would be 12, followed by performing stirring at 50° C. for two hours so as to sufficiently react the solution, thereby obtaining an orange transparent iron and silicon-containing peroxotitanic acid solution (2a).

Next, 400 mL of the iron and silicon-containing peroxotitanic acid solution (2a) was put into a 500 mL autoclave so as to be subjected to a hydrothermal treatment at 130° C. for 90 min, followed by adding a pure water to adjust the concentration thereof, thereby obtaining a dispersion liquid of titanium oxide fine particles (2A) with iron and silicon solid-dissolved therein (solid content concentration 1% by mass). As a result of performing powder X-ray diffraction analysis on the titanium oxide fine particles (2A), there were only observed peaks of an anatase-type titanium oxide; it was confirmed that iron and silicon was solid-dissolved in titanium oxide.

Working Example 2

<Preparation of Dispersion Liquid of Titanium Oxide Fine Particles with Iron, Silicon and Tungsten Solid-Dissolved Therein>

Iron chloride (III) was added to a 36% by mass titanium chloride (IV) aqueous solution so that Ti/Fe (molar ratio) would be 5, followed by diluting the solution thus prepared 10 times with a pure water. Next, gradually added to this aqueous solution for the purpose of neutralization and hydrolyzation was a 10% by mass ammonia water with sodium silicate already dissolved therein so that Ti/Si (molar ratio) would be 5 with respect to the Ti component in the titanium chloride (IV) aqueous solution, thereby obtaining a precipitate of an iron and silicon-containing titanium hydroxide. pH at that time was 8. The precipitate thus obtained was then deionized by repeating the addition of pure water and decantation. After adding sodium tungstate (VI) to the deionized precipitate of the iron and silicon-containing titanium hydroxide so that Ti/W (molar ratio) would be 200, a 35% by mass hydrogen peroxide water was then added thereto so that $H_2O_2/(Ti+Fe+Si+W)$ (molar ratio) would be 15, followed by performing stirring at 50° C. for two hours so as to sufficiently react the solution, thereby obtaining an orange transparent iron, silicon and tungsten-containing peroxotitanic acid solution (2b).

Next, 400 mL of the iron, silicon and tungsten-containing peroxotitanic acid solution (2b) was put into a 500 mL autoclave so as to be subjected to a hydrothermal treatment at 130° C. for 120 min, followed by adding a pure water to adjust the concentration thereof, thereby obtaining a dispersion liquid of titanium oxide fine particles (2B) with iron, silicon and tungsten solid-dissolved therein (solid content concentration 1% by mass). As a result of performing powder X-ray diffraction analysis on the titanium oxide fine particles (2B), there were only observed peaks of an anatase-type titanium oxide; it was confirmed that iron, silicon and tungsten was solid-dissolved in titanium oxide.

Working Example 3

<Preparation of Dispersion Liquid of Titanium Oxide Fine Particles with Iron and Silicon Solid-Dissolved Therein>

An orange transparent peroxotitanic acid solution (2c) was obtained in a similar manner as the working example 1, except that iron chloride (III) was added so that Ti/Fe (molar ratio) would be 5, and that sodium silicate was added so that Ti/Si (molar ratio) would be 20.

Next, 400 mL of the peroxotitanic acid solution (2c) was put into a 500 mL autoclave so as to be subjected to a hydrothermal treatment at 130° C. for 90 min, followed by adding a pure water to adjust the concentration thereof, thereby obtaining a dispersion liquid of titanium oxide fine particles (2C) (solid content concentration 1% by mass). As a result of performing powder X-ray diffraction analysis on the titanium oxide fine particles (2C), there were only observed peaks of an anatase-type titanium oxide.

(5) Preparation of Other Titanium Oxide Fine Particles

Preparation Example 1

<Preparation of Dispersion Liquid of Titanium Oxide Fine Particles with Tin and Molybdenum Solid-Dissolved Therein>

Tin chloride (IV) was added to and dissolved in a 36% by mass titanium chloride (IV) aqueous solution so that Ti/Sn (molar ratio) would be 20, followed by diluting the solution thus prepared 10 times with a pure water, and then neutralizing and hydrolyzing the same by gradually adding a 10% by mass ammonia water, thereby obtaining a precipitate of a tin-containing titanium hydroxide. pH at that time was 8. The precipitate thus obtained was then deionized by repeating the addition of pure water and decantation. Sodium molybdate (VI) was then added to the deionized precipitate of the tin-containing titanium hydroxide so that Ti/Mo (molar ratio) would be 250 with respect to the Ti component in the titanium chloride (IV) aqueous solution. A 35% by mass hydrogen peroxide water was then added so that $H_2O_2/(Ti+Sn+Mo)$ (molar ratio) would be 10, followed by performing stirring at 60° C. for two hours so as to sufficiently react the solution, thereby obtaining an orange transparent tin and molybdenum-containing peroxotitanic acid solution (1a).

Next, 400 mL of the tin and molybdenum-containing peroxotitanic acid solution (1a) was put into a 500 mL autoclave so as to be subjected to a hydrothermal treatment at 150° C. for 90 min, followed by adding a pure water to adjust the concentration thereof, thereby obtaining a dispersion liquid of titanium oxide fine particles (1A) with tin and molybdenum solid-dissolved therein (solid content concentration 1% by mass). As a result of performing powder X-ray diffraction analysis on the titanium oxide fine particles (1A), there were only observed peaks of a rutile-type titanium oxide; it was confirmed that tin and molybdenum was solid-dissolved in titanium oxide.

Preparation Example 2

<Preparation of Dispersion Liquid of Titanium Oxide Fine Particles with Tin, Molybdenum and Tungsten Solid-Dissolved Therein>

A dispersion liquid of titanium oxide fine particles (1B) with tin, molybdenum and tungsten solid-dissolved therein (solid content concentration 1% by mass) was obtained in a similar manner as the preparation example 1, except that tin chloride (IV) was added so that Ti/Sn (molar ratio) would be 10; that sodium molybdate (VI) and sodium tungstate (VI) were added to the deionized precipitate of the tin-containing titanium hydroxide so that Ti/Mo (molar ratio) would be 100, and Ti/W (molar ratio) would be 250; and that the hydrothermal treatment time was 120 min. As a result of performing powder X-ray diffraction analysis on the titanium oxide fine particles (1B), there were only observed peaks of a rutile-type titanium oxide; it was confirmed that tin, molybdenum and tungsten was solid-dissolved in titanium oxide.

Preparation Example 3

<Preparation of Dispersion Liquid of Titanium Oxide Fine Particles with Tin, Molybdenum and Vanadium Solid-Dissolved Therein>

Tin chloride (IV) was added to and dissolved in a 36% by mass titanium chloride (IV) aqueous solution so that Ti/Sn (molar ratio) would be 33, followed by diluting the solution thus prepared 10 times with a pure water. Next, gradually added to this aqueous solution for the purpose of neutralization and hydrolyzation was a 10% by mass ammonia water with sodium vanadate (V) already dissolved therein so that Ti/V (molar ratio) would be 2,000 with respect to the Ti component in the titanium chloride (IV) aqueous solution, thereby obtaining a precipitate of a tin and vanadium-containing titanium hydroxide. pH at that time was 8. The precipitate thus obtained was then deionized by repeating the addition of pure water and decantation. Sodium molybdate (VI) was then added to the deionized precipitate of the tin and vanadium-containing titanium hydroxide so that Ti/Mo (molar ratio) would be 500. A 35% by mass hydrogen peroxide water was then added so that $H_2O_2/(Ti+Sn+Mo+V)$ (molar ratio) would be 10, followed by performing stirring at 50° C. for three hours so as to sufficiently react the solution, thereby obtaining an orange transparent tin, molybdenum and vanadium-containing peroxotitanic acid solution (1c).

Next, 400 mL of the tin, molybdenum and vanadium-containing peroxotitanic acid solution (1c) was put into a 500 mL autoclave so as to be subjected to a hydrothermal treatment at 160° C. for 60 min, followed by adding a pure water to adjust the concentration thereof, thereby obtaining a dispersion liquid of titanium oxide fine particles (1C) with tin, molybdenum and vanadium solid-dissolved therein (solid content concentration 1% by mass). As a result of performing powder X-ray diffraction analysis on the titanium oxide fine particles (1C), there were only observed peaks of an anatase-type titanium oxide and a rutile-type titanium oxide; it was confirmed that tin, molybdenum and vanadium was solid-dissolved in titanium oxide.

Preparation Example 4

<Preparation of Dispersion Liquid of Titanium Oxide Fine Particles with Tin and Molybdenum Solid-Dissolved Therein>

Tin chloride (IV) was added to and dissolved in a 36% by mass titanium chloride (IV) aqueous solution so that Ti/Sn (molar ratio) would be 20, followed by diluting the solution thus prepared 10 times with a pure water, and then neutralizing and hydrolyzing the same by gradually adding a 10% by mass ammonia water, thereby obtaining a precipitate of a tin-containing titanium hydroxide. pH at that time was 8. The precipitate thus obtained was then deionized by repeating the addition of pure water and decantation. Sodium molybdate (VI) was then added to the deionized precipitate of the tin-containing titanium hydroxide so that Ti/Mo (molar ratio) would be 50 with respect to the Ti component in the titanium chloride (IV) aqueous solution. A 35% by mass hydrogen peroxide water was then added so that $H_2O_2/(Ti+Sn+Mo)$ (molar ratio) would be 12, followed by performing stirring at 60° C. for two hours so as to sufficiently react the solution, thereby obtaining an orange transparent tin and molybdenum-containing peroxotitanic acid solution (1d).

Next, 400 mL of the tin and molybdenum-containing peroxotitanic acid solution (1d) was put into a 500 mL autoclave so as to be subjected to a hydrothermal treatment at 150° C. for 90 min, followed by adding a pure water to adjust the concentration thereof, thereby obtaining a dispersion liquid of titanium oxide fine particles (1D) with tin and molybdenum solid-dissolved therein (solid content concentration 1% by mass). As a result of performing powder X-ray diffraction analysis on the titanium oxide fine particles (1D), there were only observed peaks of a rutile-type titanium oxide; it was confirmed that tin and molybdenum was solid-dissolved in titanium oxide.

Preparation Example 5

<Preparation of Dispersion Liquid of Titanium Oxide Fine Particles with Tin and Tungsten Solid-Dissolved Therein>

A dispersion liquid of titanium oxide fine particles (1E) with tin and tungsten solid-dissolved therein (solid content concentration 1% by mass) was obtained in a similar manner as the preparation example 1, except that tin chloride (IV) was added so that Ti/Sn (molar ratio) would be 50, and that sodium tungstate (VI) was added to the deionized precipitate of the tin-containing titanium hydroxide so that Ti/W (molar ratio) would be 33. As a result of performing powder X-ray diffraction analysis on the titanium oxide fine particles (1E), there were only observed peaks of an anatase-type titanium oxide and a rutile-type titanium oxide; it was confirmed that tin and tungsten was solid-dissolved in titanium oxide.

Preparation Example 6

<Preparation of Dispersion Liquid of Titanium Oxide Fine Particles with Tin Solid-Dissolved Therein>

A dispersion liquid of titanium oxide fine particles (1F) with tin solid-dissolved therein (solid content concentration 1% by mass) was obtained in a similar manner as the preparation example 1, except that sodium molybdate (VI) was not added. As a result of performing powder X-ray diffraction analysis on the titanium oxide fine particles (1F), there were only observed peaks of a rutile-type titanium oxide; it was confirmed that tin was solid-dissolved in titanium oxide.

Preparation Example 7

<Preparation of Dispersion Liquid of Titanium Oxide Fine Particles with Molybdenum Solid-Dissolved Therein>

A dispersion liquid of titanium oxide fine particles (1G) with molybdenum solid-dissolved therein (solid content concentration 1% by mass) was obtained in a similar manner as the preparation example 1, except that tin chloride (IV) was not added. As a result of performing powder X-ray diffraction analysis on the titanium oxide fine particles (1G), there were only observed peaks of an anatase-type titanium oxide; it was confirmed that molybdenum was solid-dissolved in titanium oxide.

Preparation Example 8

<Preparation of Dispersion Liquid of Titanium Oxide Fine Particles with Tungsten Solid-Dissolved Therein>

A dispersion liquid of titanium oxide fine particles (1H) with tungsten solid-dissolved therein (solid content concentration 1% by mass) was obtained in a similar manner as the preparation example 5, except that tin chloride (IV) was not added, and that sodium tungstate (VI) was added to the deionized precipitate of the titanium hydroxide so that Ti/W (molar ratio) would be 100. As a result of performing powder X-ray diffraction analysis on the titanium oxide fine particles (1H), there were only observed peaks of an anatase-type titanium oxide; it was confirmed that tungsten was solid-dissolved in titanium oxide.

Preparation Example 9

<Preparation of Dispersion Liquid of Titanium Oxide Fine Particles>

After diluting a 36% by mass titanium chloride (IV) aqueous solution 10 times with a pure water, a 10% by mass ammonia water was gradually added so as to neutralize and hydrolyze the same, thereby obtaining a precipitate of titanium hydroxide. pH at that time was 8.5. The precipitate thus obtained was then deionized by repeating the addition of pure water and decantation. A 35% by mass hydrogen peroxide water was then added to the deionized precipitate of titanium hydroxide so that $H_2O_2/Ti$ (molar ratio) would be 8, followed by performing stirring at 60° C. for two hours so as to sufficiently react the solution, thereby obtaining an orange transparent peroxotitanic acid solution (1i).

Next, 400 mL of the peroxotitanic acid solution (1i) was put into a 500 mL autoclave so as to be subjected to a hydrothermal treatment at 130° C. for 90 min, followed by adding a pure water to adjust the concentration thereof, thereby obtaining a dispersion liquid of titanium oxide fine particles (10 (solid content concentration 1% by mass). As a result of performing powder X-ray diffraction analysis on the titanium oxide fine particles (10, there were only observed peaks of an anatase-type titanium oxide.

Preparation Example 10

<Preparation of Dispersion Liquid of Titanium Oxide Fine Particles with Tin Solid-Dissolved Therein and with Molybdenum Component Adsorbed to (=Supported on) Surfaces>

Sodium molybdate (VI) was added to the dispersion liquid prepared in the preparation example 6, which is the dispersion liquid of the titanium oxide fine particles (1F) with tin solid-dissolved therein (solid content concentration 1% by mass), so that Ti/Mo (molar ratio) would be 250 with respect to the Ti component in the titanium oxide fine particles, thereby obtaining a titanium oxide fine particle dispersion liquid (1J).

Preparation Example 11

<Preparation of Dispersion Liquid of Titanium Oxide Fine Particles with Iron Solid-Dissolved Therein>
A dispersion liquid of titanium oxide fine particles (3A) with iron solid-dissolved therein (solid content concentration 1% by mass) was obtained in a similar manner as the working example 1, except that sodium silicate was not added. As a result of performing powder X-ray diffraction analysis on the titanium oxide fine particles (3A), there were only observed peaks of an anatase-type titanium oxide; it was confirmed that iron was solid-dissolved in titanium oxide.

Preparation Example 12

<Preparation of Dispersion Liquid of Titanium Oxide Fine Particles with Silicon Solid-Dissolved Therein>
A dispersion liquid of titanium oxide fine particles (3B) with silicon solid-dissolved therein (solid content concentration 1% by mass) was obtained in a similar manner as the working example 1, except that iron chloride (III) was not added. As a result of performing powder X-ray diffraction analysis on the titanium oxide fine particles (3B), there were only observed peaks of an anatase-type titanium oxide; it was confirmed that silicon was solid-dissolved in titanium oxide.

Preparation Example 13

<Preparation of Dispersion Liquid of Titanium Oxide Fine Particles with Iron Solid-Dissolved Therein and with Silicon Component Adsorbed to (=Supported on) Surfaces>
Sodium silicate was added to the dispersion liquid prepared in the preparation example 11, which is the dispersion liquid of the titanium oxide fine particles (3A) with iron solid-dissolved therein (solid content concentration 1% by mass), so that Ti/Si (molar ratio) would be 10 with respect to the Ti component in the titanium oxide fine particles, thereby obtaining a titanium oxide fine particle dispersion liquid (3C).

Preparation Example 14

<Preparation of Dispersion Liquid of Titanium Oxide Fine Particles with Silicon Solid-Dissolved Therein and with Iron Component Adsorbed to (=Supported on) Surfaces>
Iron chloride was added to the dispersion liquid prepared in the preparation example 12, which is the dispersion liquid of the titanium oxide fine particles (3B) with silicon solid-dissolved therein (solid content concentration 1% by mass), so that Ti/Fe (molar ratio) would be 10 with respect to the Ti component in the titanium oxide fine particles, thereby obtaining a titanium oxide fine particle dispersion liquid (3D). The titanium oxide fine particles in the titanium oxide fine particle dispersion liquid (3D) were confirmed to have agglutinated and precipitated.

Shown collectively in Table 1 are the raw material ratios, hydrothermal treatment conditions and particle diameters ($D_{50}$, $D_{90}$) of the titanium oxide fine particles prepared in each working and preparation example. The dispersion particle diameters were measured by a dynamic light scattering method using a laser light (ELSZ-2000ZS by Otsuka Electronics Co., Ltd.).

TABLE 1

| | | Titanium oxide fine particle dispersion liquid | Molar ratio | | | | | | Hydrothermal treatment | | $D_{50}$ (nm) | $D_{90}$ (nm) |
|---|---|---|---|---|---|---|---|---|---|---|---|---|
| | | | Ti/Sn | Ti/Mo | Ti/W | Ti/V | Ti/Fe | Ti/Si | Temperature (° C.) | Time (min) | | |
| Preparation example | 1 | 1A | 20 | 250 | — | — | — | — | 150 | 90 | 8 | 13 |
| | 2 | 1B | 10 | 100 | 250 | — | — | — | 150 | 120 | 7 | 12 |
| | 3 | 1C | 33 | 500 | — | 2000 | — | — | 160 | 60 | 14 | 20 |
| | 4 | 1D | 20 | 50 | — | — | — | — | 150 | 90 | 9 | 15 |
| | 5 | 1E | 50 | — | 33 | — | — | — | 150 | 90 | 16 | 26 |
| | 6 | 1F | 20 | — | — | — | — | — | 150 | 90 | 9 | 13 |
| | 7 | 1G | — | 250 | — | — | — | — | 150 | 90 | 18 | 26 |
| | 8 | 1H | — | — | 100 | — | — | — | 150 | 90 | 17 | 24 |
| | 9 | 1I | — | — | — | — | — | — | 130 | 90 | 15 | 21 |
| Working example | 1 | 2A | — | — | — | — | 10 | 10 | 130 | 90 | 20 | 25 |
| | 2 | 2B | — | — | 200 | — | 5 | 5 | 130 | 120 | 22 | 28 |
| | 3 | 2C | — | — | — | — | 5 | 20 | 130 | 90 | 15 | 20 |
| Preparation example | 11 | 3A | — | — | — | — | 10 | — | 130 | 90 | 20 | 28 |
| | 12 | 3B | — | — | — | — | — | 10 | 130 | 90 | 18 | 26 |

(6) Preparation of Titanium Oxide Fine Particle Dispersion Liquid

A titanium oxide fine particle dispersion liquid was obtained by mixing the dispersion liquid of the titanium oxide fine particles with the iron component and the silicon component solid-dissolved therein, as prepared in the working examples; and the titanium oxide fine particle dispersion liquid prepared in the preparation examples.

Reference Example 1

The dispersion liquids of the titanium oxide fine particles (1A) and (2A) were mixed together so that a mass ratio between the titanium oxide fine particles (1A) and the titanium oxide fine particles (2A) would be (1A):(2A)=80:20, thereby obtaining a titanium oxide fine particle dispersion liquid (E-1).

Reference Example 2

The dispersion liquids of the titanium oxide fine particles (1A) and (2A) were mixed together so that a mass ratio between the titanium oxide fine particles (1A) and the titanium oxide fine particles (2A) would be (1A):(2A)=60:40, thereby obtaining a titanium oxide fine particle dispersion liquid (E-2).

Reference Example 3

The dispersion liquids of the titanium oxide fine particles (1B) and (2A) were mixed together so that a mass ratio between the titanium oxide fine particles (1B) and the titanium oxide fine particles (2A) would be (1B):(2A)=80:20, thereby obtaining a titanium oxide fine particle dispersion liquid (E-3).

Reference Example 4

The dispersion liquids of the titanium oxide fine particles (1C) and (2A) were mixed together so that a mass ratio between the titanium oxide fine particles (1C) and the titanium oxide fine particles (2A) would be (1C):(2A)=80:20, thereby obtaining a titanium oxide fine particle dispersion liquid (E-4).

Reference Example 5

The dispersion liquids of the titanium oxide fine particles (1A) and (2B) were mixed together so that a mass ratio between the titanium oxide fine particles (1A) and the titanium oxide fine particles (2B) would be (1A):(2B)=80:20, thereby obtaining a titanium oxide fine particle dispersion liquid (E-5).

Reference Example 6

The dispersion liquids of the titanium oxide fine particles (1D) and (2A) were mixed together so that a mass ratio between the titanium oxide fine particles (1D) and the titanium oxide fine particles (2A) would be (1D):(2A)=70:30, thereby obtaining a titanium oxide fine particle dispersion liquid (E-6).

Reference Example 7

The dispersion liquids of the titanium oxide fine particles (1E) and (2A) were mixed together so that a mass ratio between the titanium oxide fine particles (1E) and the titanium oxide fine particles (2A) would be (1E):(2A)=60:40, thereby obtaining a titanium oxide fine particle dispersion liquid (E-7).

Reference Example 8

The dispersion liquids of the titanium oxide fine particles (1A) and (2C) were mixed together so that a mass ratio between the titanium oxide fine particles (1A) and the titanium oxide fine particles (2C) would be (1A):(2C)=90:10, thereby obtaining a titanium oxide fine particle dispersion liquid (E-8).

Reference Example 9

A silicon compound-based (silica-based) binder (colloidal silica, product name: SNOWTEX 20 by Nissan Chemical Corporation) was added to and mixed with the titanium oxide fine particle dispersion liquid (E-1) so that $TiO_2/SiO_2$ (mass ratio) would be 1.5, thereby obtaining a binder-containing titanium oxide fine particle dispersion liquid (E-9).

Reference Example 10

The dispersion liquids of the titanium oxide fine particles (1F) and (2A) were mixed together so that a mass ratio between the titanium oxide fine particles (1F) and the titanium oxide fine particles (2A) would be (1F):(2A)=80:20, thereby obtaining a titanium oxide fine particle dispersion liquid (E-10).

Reference Example 11

The dispersion liquids of the titanium oxide fine particles (1J) and (2A) were mixed together so that a mass ratio between the titanium oxide fine particles (1J) and the titanium oxide fine particles (2A) would be (1J):(2A)=80:20, thereby obtaining a titanium oxide fine particle dispersion liquid (E-11).

Comparative Reference Example 1

The dispersion liquids of the titanium oxide fine particles (1A) and (3A) were mixed together so that a mass ratio between the titanium oxide fine particles (1A) and the titanium oxide fine particles (3A) would be (1A):(3A)=80:20, thereby obtaining a titanium oxide fine particle dispersion liquid (C-1).

Comparative Reference Example 2

The dispersion liquids of the titanium oxide fine particles (1A) and (3B) were mixed together so that a mass ratio between the titanium oxide fine particles (1A) and the titanium oxide fine particles (3B) would be (1A):(3B)=80:20, thereby obtaining a titanium oxide fine particle dispersion liquid (C-2).

Comparative Reference Example 3

A titanium oxide fine particle dispersion liquid (C-3) was obtained only from the titanium oxide fine particles (1A).

Comparative Reference Example 4

A titanium oxide fine particle dispersion liquid (C-4) was obtained only from the titanium oxide fine particles (2A).

Comparative Reference Example 5

The dispersion liquids of the titanium oxide fine particles (1A) and (3C) were mixed together so that a mass ratio between the titanium oxide fine particles (1A) and the titanium oxide fine particles (3C) would be (1A):(3C)=80:20, thereby obtaining a titanium oxide fine particle dispersion liquid (C-5).

Comparative Reference Example 6

The dispersion liquids of the titanium oxide fine particles (1A) and (3D) were mixed together so that a mass ratio between the titanium oxide fine particles (1A) and the titanium oxide fine particles (3D) would be (1A):(3D)=80:20, thereby obtaining a titanium oxide fine particle dispersion liquid (C-6).

Comparative Reference Example 7

The dispersion liquids of the titanium oxide fine particles (1A) and (1I) were mixed together so that a mass ratio between the titanium oxide fine particles (1A) and the titanium oxide fine particles (1I) would be (1A):(1I)=80:20, thereby obtaining a titanium oxide fine particle dispersion liquid (C-7).

Comparative Reference Example 8

A titanium oxide fine particle dispersion liquid (C-8) was obtained in a similar manner as the reference example 9, except that the titanium oxide fine particles (2A) were not added to the titanium oxide fine particles (1A).

Comparative Reference Example 9

A titanium oxide fine particle dispersion liquid (C-9) was obtained only from the titanium oxide fine particles (1B).

examples or the comparative reference examples to a PET film of an A4 size in a manner such that there would be formed thereon a photocatalyst thin film (thickness: about 80 nm) containing 20 mg of photocatalyst titanium oxide fine particles, followed by performing drying in an oven set to 80° C. for an hour, thereby obtaining a sample member for use in evaluation of acetaldehyde gas decomposition capability.

[Photocatalytic Capability Test Under UV Irradiation]

With regard to sample members having the photocatalyst thin films of the reference examples 1, 8 and 9; as well as comparative reference examples 3, 7 and 8, an acetaldehyde decomposition test was performed under an irradiation of a UV fluorescent lamp. Evaluation was conducted based on the time it took for the acetaldehyde concentration to be reduced from 20 ppm which was an initial concentration to 1 ppm.

Shown collectively in Table 2 are the mixing ratios, dispersion particle diameters ($D_{50}$, $D_{90}$) and acetaldehyde gas decomposition test results of the titanium oxide fine particle dispersion liquids. The dispersion particle diameters were measured by a dynamic light scattering method using a laser light (ELSZ-2000ZS by Otsuka Electronics Co., Ltd.).

TABLE 2

| | | Titanium oxide fine particle dispersion liquid | | | Evaluation result | | |
|---|---|---|---|---|---|---|---|
| | Evaluation sample | Type | | Mixing ratio | $D_{50}$ (nm) | $D_{90}$ (nm) | Time taken to 1 ppm (h) |
| Reference example 1 | E-1 | 1A | 2A | 80:20 | 10 | 15 | 1.5 |
| Reference example 8 | E-8 | 1A | 2C | 90:10 | 9 | 14 | 2.7 |
| Comparative reference example 3 | C-3 | 1A | — | 100:0 | 8 | 13 | 3.3 |
| Comparative reference example 7 | C-7 | 1A | 1I | 80:20 | 11 | 16 | 3.1 |
| Reference example 9 | E-9 | 1A | 2A | 80:20 | 11 | 17 | 3.9 |
| Comparative reference example 8 | C-8 | 1A | — | 100:0 | 12 | 20 | 15.5 |

Comparative Reference Example 10

A titanium oxide fine particle dispersion liquid (C-10) was obtained only from the titanium oxide fine particles (1C).

Comparative Reference Example 11

A titanium oxide fine particle dispersion liquid (C-11) was obtained only from the titanium oxide fine particles (1D).

Comparative Reference Example 12

A titanium oxide fine particle dispersion liquid (C-12) was obtained only from the titanium oxide fine particles (1E).

Comparative Reference Example 13

A titanium oxide fine particle dispersion liquid (C-13) was obtained only from the titanium oxide fine particles (1F).

(7) Production of Sample Member Having Photocatalyst Thin Film

A #7 wire bar coater was used to apply each titanium oxide fine particle dispersion liquid prepared in the reference As can be seen from the results of the reference examples 1, 8 and comparative reference example 3, it was confirmed that by mixing the titanium oxide fine particles (2A) or (2C) with the iron component and silicon component solid-dissolved therein with the titanium oxide fine particles (1A), the photocatalytic activity had been enhanced as compared to when the titanium oxide fine particles (1A) were used alone. Further, as can be seen from the result of the comparative reference example 7, it was confirmed that such enhancement in activity was even superior to that when there were mixed the titanium oxide fine particles (10 with no iron and silicon solid-dissolved therein.

Similarly, as can be seen from the results of the reference example 9 and comparative reference example 8, it was confirmed that even in the case of a binder-containing photocatalyst thin film, by mixing the titanium oxide fine particles (2A) with the iron component and silicon component solid-dissolved therein with the titanium oxide fine particles (1A), the photocatalytic activity had been enhanced significantly as compared to when the titanium oxide fine particles (1A) were used alone.

[Photocatalytic Capability Test Under Visible Light Irradiation]

An acetaldehyde decomposition test was performed on the sample members having the photocatalyst thin films of the reference and comparative reference examples under an irradiation of a visible light by LED. Evaluation was conducted based on the time it took for the acetaldehyde concentration to be reduced from 5 ppm which was an initial concentration to 1 ppm.

Here, cases where the acetaldehyde concentration failed to be reduced to 1 ppm in 24 hours were marked with "-" in a column titled "Time taken to be decomposed to 1 ppm" in Tables 3 and 4, and the corresponding concentrations are shown in a column titled "Concentration after 24 h" in these tables.

Shown collectively in Table 3 are the mixing ratios, particle diameters ($D_{50}$, $D_{90}$) and acetaldehyde gas decomposition test results of the titanium oxide fine particle dispersion liquids, when using the titanium oxide fine particles (1A) as the first titanium oxide fine particles. The dispersion particle diameters were measured by a dynamic light scattering method using a laser light (ELSZ-2000ZS by Otsuka Electronics Co., Ltd.).

and silicon solid-dissolved therein were mixed with the titanium oxide fine particles (1A) exhibited a favorable acetaldehyde decomposition capability under visible light irradiation.

As can be seen from the results of the reference example 9 and comparative reference example 8, it was confirmed that even in the case of a binder-containing photocatalyst thin film, by mixing the titanium oxide fine particles (2A) with the iron component and silicon component solid-dissolved therein with the titanium oxide fine particles (1A), the photocatalytic activity under visible light irradiation had been enhanced significantly as compared to when the titanium oxide fine particles (1A) were used alone.

As can be seen from the results of the comparative reference example 3, an insufficient photocatalytic activity was observed under visible light irradiation when the titanium oxide fine particles with tin and molybdenum solid-dissolved therein were used alone.

As can be seen from the result of the comparative reference example 5, as for the silicon component, by merely having such silicon component supported on the surfaces of the titanium oxide fine particles, there could only be observed an insufficient effect of enhancing photocatalytic

TABLE 3

| | | Titanium oxide fine particle dispersion liquid | | | Evaluation result | | | |
|---|---|---|---|---|---|---|---|---|
| | Evaluation sample | Type | | Mixing ratio | $D_{50}$ (nm) | $D_{90}$ (nm) | Time taken to be decomposed to 1 ppm (h) | Concentration after 24 h (ppm) |
| Reference example 1 | E-1 | 1A | 2A | 80:20 | 10 | 15 | 2.0 | — |
| Reference example 2 | E-2 | 1A | 2A | 60:40 | 12 | 29 | 3.9 | — |
| Reference example 5 | E-5 | 1A | 2B | 80:20 | 12 | 18 | 2.4 | — |
| Reference example 8 | E-8 | 1A | 2C | 90:10 | 9 | 14 | 3.5 | — |
| Reference example 9 | E-9 | 1A | 2A | 80:20 | 11 | 17 | 3.5 | — |
| Comparative reference example 1 | C-1 | 1A | 3A | 80:20 | 13 | 20 | 9.0 | — |
| Comparative reference example 2 | C-2 | 1A | 3B | 80:20 | 13 | 18 | — | 2.8 |
| Comparative reference example 3 | C-3 | 1A | — | 100:0 | 8 | 13 | — | 3.8 |
| Comparative reference example 4 | C-4 | — | 2A | 0:100 | 20 | 25 | — | 5.0 |
| Comparative reference example 5 | C-5 | 1A | 3C | 80:20 | 14 | 20 | 14.0 | — |
| Comparative reference example 6 | C-6 | 1A | 3D | 80:20 | Agglutinated, Precipitated | | — | — |
| Comparative reference example 7 | C-7 | 1A | 1I | 80:20 | 11 | 16 | — | 4.0 |
| Comparative reference example 8 | C-8 | 1A | — | 100:0 | 12 | 20 | — | 4.8 |

As compared to the case (comparative reference example 1) where the titanium oxide fine particles with only iron solid-dissolved therein were mixed with the titanium oxide fine particles (1A) with tin and molybdenum solid-dissolved therein; the case (comparative reference example 2) where the titanium oxide fine particles with only silicon solid-dissolved therein were mixed with the titanium oxide fine particles (1A); or the case (comparative reference example 7) where the titanium oxide fine particles with no metal component solid-dissolved therein were mixed with the titanium oxide fine particles (1A), the case (reference example 1) where the titanium oxide fine particles with iron activity under visible light irradiation as compared to the titanium oxide fine particles with the silicon component solid-dissolved therein.

Further, as can be seen from the result of the comparative reference example 6, when the iron component is not solid-dissolved in the titanium oxide fine particles, the iron component will cause the titanium oxide fine particles in the dispersion liquid to agglutinate and precipitate, which may then turn the photocatalyst film obtained opaque.

In this way, a superior photocatalytic capability was confirmed with the titanium oxide fine particle mixture of the present invention that contains the titanium oxide fine particles with the two iron and silicon components solid-dissolved therein.

Moreover, shown collectively in Table 4 are the mixing ratios, dispersion particle diameters ($D_{50}$, $D_{90}$) and acetaldehyde gas decomposition test results of the titanium oxide fine particle dispersion liquids, when using various titanium oxide fine particles. The dispersion particle diameters were measured by a dynamic light scattering method using a laser light (ELSZ-2000ZS by Otsuka Electronics Co., Ltd.).

TABLE 4

| | | Titanium oxide fine particle dispersion liquid | | | | Evaluation result | |
|---|---|---|---|---|---|---|---|
| | | | | | | Time taken to be | Concentration |
| | Evaluation sample | Type | | Mixing ratio | $D_{50}$ (nm) | $D_{90}$ (nm) | decomposed to 1 ppm (h) | after 24 h (ppm) |
| Reference example 3 | E-3 | 1B | 2A | 80:20 | 11 | 18 | 3.2 | — |
| Comparative reference example 9 | C-9 | 1B | — | 100:0 | 7 | 12 | — | 4.5 |
| Reference example 4 | E-4 | 1C | 2A | 80:20 | 15 | 21 | 4.3 | — |
| Comparative reference example 10 | C-10 | 1C | — | 100:0 | 14 | 20 | — | 4.6 |
| Reference example 6 | E-6 | 1D | 2A | 70:30 | 13 | 20 | 3.4 | — |
| Comparative reference example 11 | C-11 | 1D | — | 100:0 | 9 | 15 | — | 4.6 |
| Reference example 7 | E-7 | 1E | 2A | 60:40 | 18 | 26 | 5.8 | — |
| Comparative reference example 12 | C-12 | 1E | — | 100:0 | 16 | 26 | — | 4.7 |
| Reference example 10 | E-10 | 1F | 2A | 80:20 | 10 | 14 | — | 1.8 |
| Comparative reference example 13 | C-13 | 1F | — | 100:0 | 9 | 13 | — | 5.0 |
| Reference example 11 | E-11 | 1J | 2A | 80:20 | 11 | 17 | — | 1.5 |

As shown in Table 4, a favorable acetaldehyde decomposition capability was observed with a photocatalyst thin film produced from the dispersion liquid of the titanium oxide fine particle mixture of the titanium oxide fine particles with the tin component and the visible light responsiveness-enhancing transition metal component (molybdenum, tungsten or vanadium component) solid-dissolved therein; and the second titanium oxide fine particles with the iron component and the silicon component solid-dissolved therein, even with a small amount of the photocatalyst and under an irradiation by LED which only emits visible lights.

INDUSTRIAL APPLICABILITY

The dispersion liquid of the titanium oxide fine particles of the present invention with iron and silicon solid-dissolved therein can have its photocatalytic effect enhanced simply by being mixed into a conventional photocatalyst, thus being useful for purposes of, for example, cleaning, deodorizing and bringing about an antibacterial effect on the surface of a base material.

The invention claimed is:

1. Titanium oxide fine particles with at least an iron component and a silicon component solid-dissolved therein, wherein a molar ratio of titanium and iron in the titanium oxide fine particles is a range of Ti:Fe=5:1 to 100:1, and a molar ratio of titanium and silicon in the titanium oxide fine particles is in a range of Ti:Si=1:1 to 1,000:1.

2. The titanium oxide fine particles according to claim 1, wherein the titanium oxide fine particles further have at least one transition metal component selected from molybdenum, tungsten and vanadium solid-dissolved therein.

3. A titanium oxide fine particle dispersion liquid wherein the titanium oxide fine particles according to claim 2 which are the titanium oxide fine particles with the iron and silicon components solid-dissolved therein are dispersed in an aqueous dispersion medium.

4. A titanium oxide fine particle dispersion liquid wherein the titanium oxide fine particles according to claim 1 which are the titanium oxide fine particles with the iron and silicon components solid-dissolved therein are dispersed in an aqueous dispersion medium.

5. The titanium oxide fine particles according to claim 1, wherein the molar ratio of titanium and silicon in the titanium oxide fine particles is in a range of Ti:Si=2:1 to 200:1.

6. The titanium oxide fine particles according to claim 1, wherein the molar ratio of titanium and silicon in the titanium oxide fine particles is in a range of Ti:Si=3:1 to 100:1.

7. The titanium oxide fine particles according to claim 1, wherein a crystal phase of the titanium oxide fine particles is the anatase-type.

8. The titanium oxide fine particles according to claim 1, wherein only the iron component and the silicon component are solid-dissolved therein.

9. A method for producing a dispersion liquid of titanium oxide fine particles with an iron component and a silicon component solid-dissolved therein, comprising:
(1) a step of producing an iron component and silicon component-containing peroxotitanic acid solution from a raw material titanium compound, iron compound, silicon compound, basic substance, hydrogen peroxide and aqueous dispersion medium wherein a molar ratio of titanium and iron in the peroxotitanic acid solution is a range of Ti:Fe=5:1 to 100:1, and a molar ratio of titanium and silicon in the peroxotitanic acid solution is in a range of Ti:Si=1:1 to 1,000:1; and (2) a step of obtaining a dispersion liquid of titanium oxide fine particles with the iron component and silicon component solid-dissolved therein, by heating the iron component and silicon component-containing peroxotitanic acid solution produced in the step (1) at 80 to 250° C. under a controlled pressure.

* * * * *